(12) United States Patent
Muramatsu et al.

(10) Patent No.: US 12,054,089 B2
(45) Date of Patent: Aug. 6, 2024

(54) VEHICLE WITH CENTRALIZED LASER BEAM SOURCE

(71) Applicant: YAMAHA HATSUDOKI KABUSHIKI KAISHA, Iwata (JP)

(72) Inventors: Kenichi Muramatsu, Shizuoka (JP); Takehiro Inoue, Shizuoka (JP); Atsushi Kamo, Shizuoka (JP); Yoko Takagi, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/339,056

(22) Filed: Jun. 21, 2023

(65) Prior Publication Data

US 2023/0331142 A1 Oct. 19, 2023

Related U.S. Application Data

(63) Continuation-in-part of application No. PCT/JP2021/047474, filed on Dec. 22, 2021.

(30) Foreign Application Priority Data

Dec. 22, 2020 (JP) ................. 2020-212431

(51) Int. Cl.
*B60Q 1/00* (2006.01)
*B60Q 1/04* (2006.01)
(Continued)

(52) U.S. Cl.
CPC ............. *B60Q 1/0011* (2013.01); *B60Q 1/04* (2013.01); *B60Q 1/56* (2013.01); *B62J 6/022* (2020.02); *B62J 6/04* (2013.01); *B62M 7/02* (2013.01)

(58) Field of Classification Search
CPC . B60Q 1/0011; B60Q 1/04; B60Q 1/56; B62J 6/022; B62J 6/04; B62M 7/02; B62M 7/04; B62M 7/06
(Continued)

(56) References Cited

U.S. PATENT DOCUMENTS 6,056,426 A * 5/2000 Jenkins ................ G02B 6/0008
362/558
2012/0025962 A1 2/2012 Toll
(Continued)

FOREIGN PATENT DOCUMENTS

JP 2018144573 A 9/2018

*Primary Examiner* — Laura K Tso
(74) *Attorney, Agent, or Firm* — Rabin & Berdo, P.C.

(57) ABSTRACT

A vehicle that is the leaning vehicle or the straddled vehicle includes a fiber optic cable extending from a laser beam source unit to both a forward light-emitting part and a rearward light-emitting part via a forward-rearward branch portion, the fiber optic cable allowing a laser beam emitted from the laser beam source unit to be branched in the forward-rearward branch portion, and then supplied to both the forward light-emitting part and the rearward light-emitting part. A length of the fiber optic cable between the laser beam source unit and the forward-rearward branch portion is shorter than a total length of the fiber optic cable between the forward-rearward branch portion and the forward light-emitting part and between the forward-rearward branch portion and the rearward light-emitting part in a side view of the vehicle.

7 Claims, 4 Drawing Sheets

(51) Int. Cl.
  *B60Q 1/56*   (2006.01)
  *B62J 6/022*  (2020.01)
  *B62J 6/04*   (2020.01)
  *B62M 7/02*   (2006.01)

(58) Field of Classification Search
  USPC .................................... 362/473, 475, 511
  See application file for complete search history.

(56) References Cited

U.S. PATENT DOCUMENTS

| | | | | |
|---|---|---|---|---|
| 2016/0121782 A1* | 5/2016 | Soenen | ................ | G02B 6/0006 362/511 |
| 2018/0252380 A1* | 9/2018 | Kitayama | ............ | B60Q 1/0035 |
| 2023/0331141 A1* | 10/2023 | Inoue | ........................ | B62J 6/04 |

* cited by examiner

VEHICLE WITH CENTRALIZED LASER BEAM SOURCE

CROSS-REFERENCE TO RELATED APPLICATIONS

This is a continuation-in-part application of International Application PCT/JP2021/047474, filed on Dec. 22, 2021, which claims priority from Japanese Patent Application No. 2020-212431, filed on Dec. 22, 2020. The contents of the applications are incorporated herein by reference.

TECHNICAL FIELD

The present teaching relates to a vehicle that is a leaning vehicle or a straddled vehicle.

BACKGROUND ART

A vehicle with a lighting equipment system that uses a laser beam is shown, for example, in Patent Literature 1 (PTL 1). The vehicle according to PTL 1 is a straddled vehicle. The straddled vehicle of PTL 1 can lean left and right.

A lighting equipment system includes a laser beam source, a light guide part for guiding light from the laser beam source to a desired location, and a plurality of light-emitting parts disposed at the distal end of the light guide part, the plurality of light-emitting parts being configured to radiate light from the light guide part toward the surroundings of the vehicle. The plurality of light-emitting parts includes light-emitting parts that emit light in a variety of manners.

In PTL 1, a vehicle according to an embodiment includes a light-emitting part provided to a front cover so as to function as a high-beam light source, and a light-emitting part provided to a back mirror so as to function as an auxiliary high-beam light source. The laser beam source is disposed below a seat. The light guide part has a shared portion extending forward from the laser beam source, non-shared portions extending from the shared portion to the respective light-emitting parts, and a branch portion branching in the up-down direction from the shared portion to the respective non-shared portions, the branch portion being disposed near a steering handle.

In PTL 1, a vehicle according to another embodiment includes a pair of left and right light-emitting parts provided to a front cover so as to function as a high-beam light source, and a pair of left and right light-emitting parts provided to the front cover so as to function as a low-beam light source. Two laser beam sources are disposed below a seat. One of the laser beam sources is for high-beam lighting. The other of the laser beam sources is for low-beam lighting. A light guide part for high-beam lighting and a light guide part for low-beam lighting each have: a shared portion extending forward from the laser beam source, non-shared portions extending from the shared portion to the respective light-emitting parts, and a branch portion branching in the left-right direction from the shared portion to the respective non-shared portions; the branch portion being disposed near a steering handle.

CITATION LIST

Patent Literature

PTL 1: Japanese Patent Application Laid-Open No. 2018-144573

SUMMARY OF INVENTION

Technical Problem

The present teaching aims to adopt a laser beam source in a vehicle that is a leaning vehicle or a straddled vehicle in such a manner so as to increase the degree of freedom of the laser beam source's arrangement, in order to achieve a compact arrangement and efficient use of a space.

Solution to the Problem

To attain the foregoing aim, the inventors of the present teaching conducted studies as follows.

When a rider operates a leaning vehicle to make a turn for example, the rider needs to shift their weight. A straddled vehicle travels with a rider straddling a seat. Thus, a vehicle that is the leaning vehicle or the straddled vehicle is configured to have a smaller vehicle width than that of a typical four-wheeled vehicle having a cabin. In general, maneuverability, agility, and simplicity are required of a vehicle that is the leaning vehicle or the straddled vehicle. Thus, a desire for both downsizing and weight reducing of the vehicle that is the leaning vehicle or the straddled vehicle is very high. Components in a vehicle body are densely arranged.

As mentioned above, in the vehicle according to PTL 1, the laser beam source is disposed below the seat. The shared portion of the light guide part extends from the laser beam source to the branch portion, which is near the steering handle. In the branch portion, the shared portion branches up and down, or left and right, to serve as non-shared portions extending to reach the respective light-emitting parts. In a layout of PTL 1, if arrangement of the laser beam source is changed, the length of the shared portion is changed largely. In addition, the shared portion is relatively long. Compact arrangement is difficult, therefore. Moreover, creating and/or changing a routing position is required. In a vehicle that is a leaning vehicle or a straddled vehicle, however, vehicle components are arranged relatively densely, as mentioned above. Thus, there is a limitation on a routing space, and creating and/or changing the routing position is not easy. Consequently, freely changing the position of the laser beam source is also difficult. The laser beam source is relatively large in size, and therefore if the degree of freedom of the laser beam source's arrangement is not high, adjustment of the positional relationship of the other components is not easy, either. As a result, efficient use of an equipment installation space is difficult. Agility, maneuverability, and simplicity are important in a vehicle that is a leaning vehicle or a straddled vehicle, and it is desirable to obtain both a compact arrangement and efficient use of a space.

The inventors of the present teaching conducted studies about the aforementioned issues, and accomplished the present teaching. The present teaching adopts the following configuration.

A vehicle that is a leaning vehicle or a straddled vehicle includes:

a vehicle body supporting a plurality of wheels, the vehicle body including a vehicle lateral single seat and a footrest part, the vehicle lateral single seat permitting, in the vehicle, only one rider to sit thereon in the lateral direction of the vehicle, the footrest part being configured such that the rider sitting on the vehicle lateral single seat places their foot on the footrest part while driving the vehicle;

one laser beam source unit disposed in the vehicle body, the one laser beam source unit having one or more laser beam source elements and an output part shared by the one or more laser beam source elements, the one laser beam source unit being configured such that a laser beam outputted from the one or more laser beam source elements is emitted from the output part;

a forward light-emitting part disposed further in the forward direction than the laser beam source unit in the front-back direction of the vehicle body, the forward light-emitting part being configured to emit light from a laser beam supplied by the laser beam source unit;

a rearward light-emitting part disposed further in the rearward direction than the laser beam source unit in the front-back direction of the vehicle body, the rearward light-emitting part being configured to emit light from a laser beam supplied by the laser beam source unit; and a fiber optic cable extending from the laser beam source unit to both the forward light-emitting part and the rearward light-emitting part via a forward-rearward branch portion, the fiber optic cable allowing a laser beam emitted from the laser beam source unit to be branched in the forward-rearward branch portion, and then supplied to both the forward light-emitting part and the rearward light-emitting part, the fiber optic cable being provided such that a length of a part of the fiber optic cable from the laser beam source unit to the forward-rearward branch portion is shorter than a total length of a part of the fiber optic cable from the forward-rearward branch portion to the forward light-emitting part and a part of the fiber optic cable from the forward-rearward branch portion to the rearward light-emitting part in a side view of the vehicle, the laser beam source unit further having a first directional end toward a first direction and a second directional end toward a second direction that is opposite to the first direction, the laser beam source unit being configured to supply a laser beam emitted from the output part that is disposed at a position further in the first direction than the second directional end, to each of the forward light-emitting part and the rearward light-emitting part via the forward-rearward branch portion that is disposed at a position further in the first direction than the first directional end, wherein the first direction and the second direction can be any of the front-back direction, left-right direction, or up-down direction of the vehicle, at least a part of the laser beam source unit being positioned further in the upward direction than the footrest part in a side view of the vehicle, and positioned between the left end and the right end of the vehicle lateral single seat in a plan view of the vehicle.

The forward light-emitting part and the rearward light-emitting part share the single laser beam source unit, which makes it possible to downsize the laser beam source unit as a whole, as compared to when two or more laser beam source units are used. Consequently, the laser beam source unit can be arranged with a high degree of freedom. Since the single laser beam source unit is disposed between the forward light-emitting part and the rearward light-emitting part in the front-back direction of the vehicle, a change in the length of the fiber optic cable as a whole can be suppressed or prevented even when the position of the branch portion is changed. In addition, the length of the part (shared portion) of the fiber optic cable from the laser beam source unit to the forward-rearward branch portion is shorter than the total length of the parts (non-shared portions) of the fiber optic cable from the forward-rearward branch portion to the forward light-emitting part and to the rearward light-emitting part. This allows the laser beam source unit to be arranged with a high degree of freedom in the front-back direction of the vehicle. This can allow flexibility in the layout of equipment. Efficient use of an equipment installation space is enabled. Furthermore, since the shared portion is short, a size increase of a routing space can be prevented or suppressed, and thus compact arrangement is enabled. Since agility, maneuverability, and simplicity are important in a vehicle that is a leaning vehicle or a straddled vehicle, obtaining both the compact arrangement and the efficient use of a space is preferred.

In the foregoing vehicle, the laser beam source unit is configured to supply a laser beam emitted from the output part, which is disposed at a position further in the first direction than the second directional end, to each of the forward light-emitting part and the rearward light-emitting part via the forward-rearward branch portion, which is disposed at a position further in the first direction than the first directional end; and at least a part of the laser beam source unit is positioned further in the upward direction than the footrest part in a side view of the vehicle, and positioned between the left end and the right end of the vehicle lateral single seat in a plan view of the vehicle. Accordingly, it is possible to shorten the length of the part (shared portion) of the fiber optic cable from the laser beam source unit to the forward-rearward branch portion while shortening the lengths of the parts (non-shared portions) of the fiber optic cable from the forward-rearward branch portion to the forward light-emitting part and to the rearward light-emitting part. More details are as below.

Since the forward-rearward branch portion can be closer to the output part, the length of the part (shared portion) of the fiber optic cable from the laser beam source unit to the forward-rearward branch portion can be shortened. The forward light-emitting part and the rearward light-emitting part are often disposed in an upper portion of the vehicle from the viewpoint of visual recognizability and/or visibility. Thus, if at least a part of the laser beam source unit is positioned further in the upward direction than the footrest part in a side view of the vehicle as described above, the laser beam source unit can be disposed near the forward light-emitting part and the rearward light-emitting part in the up-down direction of the vehicle. As a result, the lengths of the parts (non-shared portions) of the fiber optic cable from the forward-rearward branch portion to the forward light-emitting part and to the rearward light-emitting part can also be shortened.

An embodiment may have the following configuration, for example.

The forward light-emitting part is disposed further in the forward direction than the front end of the vehicle lateral single seat such that the forward light-emitting part is visible in a front view of the vehicle and/or such that the forward light-emitting part can be visually recognized by the rider sitting on the vehicle lateral single seat; and the rearward light-emitting part is disposed further in the rearward direction than the front end of the vehicle lateral single seat such that the rearward light-emitting part is visible in a rear view of the vehicle. This allows the forward light-emitting part and the rearward light-emitting part to be at a long distance from each other in the front-back direction of the vehicle, and the laser beam source unit is disposed therebetween, which improves the degree of freedom of arrangement of the laser beam source unit. Both the compact arrangement and the efficient use of a space can be obtained at a higher level.

The fiber optic cable is provided such that, in a side view of the vehicle, a length of a part of the fiber optic cable from the laser beam source unit to the forward-rearward branch portion is shorter than at least either of a length of a part of the fiber optic cable from the forward-rearward branch portion to the forward light-emitting part or a length of a part of the fiber optic cable from the forward-rearward branch portion to the rearward light-emitting part. Further shortening of the shared portion is enabled. Both the compact arrangement and the efficient use of a space can be obtained at a higher level.

Each of the forward light-emitting part and the rearward light-emitting part may function as a flashing light.

The vehicle may further include a motive power source that generates power to be transmitted to at least one of the plurality of wheels, and each of the forward light-emitting part and the rearward light-emitting part may be functioning all the time while at least the motive power source is in operation. The situation "the motive power source is in operation" may be a state where, for example, the vehicle travels because the rider manipulates an accelerator operator or the like. That is, the situation encompasses an idling state in a case of the motive power source being an engine. In a case of the motive power source being a motor, the situation encompasses a state where the motor is ready to drive (in stand-by state).

The forward light-emitting part may function as at least one of a position lamp or a meter lamp, and the rearward light-emitting part may function as at least one of a position lamp or a license plate lamp.

In a side view of the vehicle, a first part, a second part, and a third part of the fiber optic cable may each have the upper portion and the lower portion in the up-down direction of the vehicle, the first part being a part from the laser beam source unit to the forward-rearward branch portion, the second part being a part from the forward-rearward branch portion to the forward light-emitting part, the third part being a part from the forward-rearward branch portion to the rearward light-emitting part; and in the up-down direction of the vehicle, a length from the upper portion to the lower portion of the first part may be shorter than a length from the upper portion to the lower portion of the second part, and shorter than a length from the upper portion to the lower portion of the third part. Further shortening of the shared portion is enabled. Both the compact arrangement and the efficient use of a space can be obtained at a higher level.

The vehicle that is a leaning vehicle or a straddled vehicle is, for example, a small-size vehicle having a boarding capacity of one or two persons. The vehicle includes one or two vehicle lateral single seats, each permitting only one rider to sit thereon in the lateral direction of the vehicle, for example. The two vehicle lateral single seats are disposed one before the other in the front-back direction of the vehicle, for example. The two vehicle lateral single seats may be formed separately, or may be formed integrally as a single seat member, for example.

The vehicle lateral single seat is simply required to permit only one rider to sit thereon in the lateral direction, or the left-right direction, of the vehicle. For example, a seat on which the rider sits in a straddling manner is the vehicle lateral single seat. For example, a seat of which the seating surface has an area for only one person in the lateral direction of the vehicle is the vehicle lateral single seat. The seating surface is, for example, a surface touched by buttocks of a rider or a surface supporting the buttocks of the rider while the rider is driving the vehicle.

The maximum length of the vehicle lateral single seat in the left-right direction is larger than ½ of the maximum length of the vehicle in the left-right direction, for example.

The maximum length of the vehicle lateral single seat in the left-right direction is larger than ½ of the maximum length of the vehicle body frame in the left-right direction, for example. The maximum length of the vehicle lateral single seat in the left-right direction is larger than ½ of the maximum length of the footrest part in the left-right direction, for example.

When the footrest part is configured to have both of left and right feet placed thereon, the maximum length of the footrest part in the left-right direction is a length from the left end to the right end of the footrest part in the left-right direction of the vehicle, that is, in the lateral direction of the vehicle. Examples of the footrest part configured to have both of left and right feet placed thereon include a foot board of a scooter.

When the footrest part includes a left footrest part for having a left foot placed thereon and a right footrest part for having a right foot placed thereon, the maximum length of the footrest part in the left-right direction is a length from the left end of the left footrest part to the right end of the right footrest part in the left-right direction of the vehicle. Examples of the footrest part including the left footrest part for having a left foot placed thereon and the right footrest part for having the right foot placed thereon include a step of a motorcycle.

The vehicle lateral single seat is located in a middle portion of the vehicle in the left-right direction. An aspect in which the vehicle lateral single seat is located in the middle portion of the vehicle in the left-right direction encompasses an aspect in which, for example, the vehicle lateral single seat overlaps a straight line that passes through the center of the vehicle in the left-right direction and extends in the front-back direction of the vehicle in a plan view.

In a side view of the vehicle, a part or the entirety of the laser beam source unit is positioned further in the upward direction than the footrest part. In a side view of the vehicle, a part or the entirety of the laser beam source unit may be positioned immediately above the footrest part, or may not be positioned immediately above the footrest part. In a side view of the vehicle, a part or the entirety of the laser beam source unit is positioned further in the upward direction than the footrest part in the up-down direction of the vehicle. For example, in a side view of the vehicle, the entirety of the laser beam source unit is positioned further in the upward direction than the footrest part in the up-down direction of the vehicle.

In a plan view of the vehicle, a part or the entirety of the laser beam source unit is positioned between the left end and the right end of the vehicle lateral single seat. In other words, in a plan view of the vehicle, a part or the entirety of the laser beam source unit is positioned between a left end reference line and a right end reference line, the left end reference line passing through the left end of the vehicle lateral single seat and extending in the front-back direction of the vehicle, the right end reference line passing through the right end of the vehicle lateral single seat and extending in the front-back direction of the vehicle. In other words, in a plan view of the vehicle, a part or the entirety of the laser beam source unit is positioned further in the rightward direction than the left end of the vehicle lateral single seat, and positioned further in the leftward direction than the right end of the vehicle lateral single seat. In a plan view of the vehicle, a part or the entirety of the laser beam source unit may or may not overlap the vehicle lateral single seat.

The opposite end portions of the vehicle lateral single seat in the left-right direction are supported by the vehicle body frame. The vehicle body frame is disposed further in the downward direction than the vehicle lateral single seat, for example. The vehicle body frame includes a left frame portion and a right frame portion, the left frame portion supporting a left end portion of the vehicle lateral single seat, the right frame portion supporting a right end portion of the vehicle lateral single seat, for example. In a plan view of the vehicle, a part or the entirety of the laser beam source unit is positioned rightward of the right end of the left frame portion, and positioned leftward of the left end of the right frame portion, for example.

The vehicle includes at least one front wheel and at least one rear wheel, for example. The vehicle includes a drive source that generates power to be transmitted to a wheel, for example. The drive source may be an engine, an electrical motor, or both an engine and an electrical motor, for example.

The vehicle includes a power supply that stores electric power for use to output a laser beam, for example.

The vehicle includes a steering handle, for example. In a plan view of the vehicle, for example, the length of the steering handle in the left-right direction is larger than ½ of the maximum length of the vehicle in the left-right direction while the steering handle is in a handle neutral position, which is a handle position taken when the vehicle travels straight. Such a steering handle is a handlebar, for example. The handlebar may be a single handlebar extending continuously in the left-right direction of the vehicle, or may include a left handlebar and a right handlebar arranged separately from each other in the left-right direction of the vehicle, for example.

When the steering handle is positioned in the handle neutral position, the vehicle lateral single seat is positioned between the left end and the right end of the steering handle in a plan view of the vehicle, for example. The maximum length of the vehicle lateral single seat in the left-right direction is larger than ½ of the maximum length of the steering handle in the left-right direction, for example.

The straddled vehicle is a vehicle including the vehicle lateral single seat on which a rider sits in a saddle-straddling fashion, for example. The straddled vehicle is one on which a rider rides in a saddle-straddling fashion, for example. The straddled vehicle is not particularly limited, and examples thereof include motorcycles. The straddled vehicle is not limited to motorcycles, and may be, for example, a three-wheeled motorcycle having three wheels, an all-terrain vehicle (ATV) having four wheels, or a recreational off-road vehicle (ROV).

The leaning vehicle is one that makes a turn in a leaning posture. The leaning vehicle is configured to lean inward of a curve when making a turn. The leaning vehicle includes a vehicle body that leans inward of a curve when making a turn. The leaning vehicle may also serve as the straddled vehicle. The leaning vehicle may be, for example, a straddled vehicle configured to lean inward of a curve when making a turn. Examples of such a vehicle include a motorcycle, a three-wheeled motorcycle, and the like. The three-wheeled motorcycle may be a type having two front wheels, or may be a type having two rear wheels. The leaning vehicle may include a seat of sitting-in type, for example.

The vehicle body includes the vehicle lateral single seat, which permits only one rider to sit thereon in the lateral direction of the vehicle. The vehicle lateral single seat is supported by the vehicle body frame, which constitutes the vehicle body, for example. The vehicle body frame includes the left frame portion and the right frame portion, for example. The left frame portion and the right frame portion are disposed further in the downward direction than the vehicle lateral single seat, to support the vehicle lateral single seat, for example. The vehicle body supports a plurality of wheels, each being rotatable. The plurality of wheels includes at least one front wheel and at least one rear wheel, for example. The plurality of wheels is disposed at a distance from each other in the front-back direction of the vehicle, for example. The plurality of wheels includes at least one steerable wheel and at least one driving wheel, for example. The steerable wheel is steered by a rider of the vehicle manipulating the steering handle, for example. Instead of the steering handle, for example, a joystick or the like may be manipulated by the rider. As the steerable wheel is steered, the travel direction of the vehicle changes. The driving wheel is rotated by receiving power from the motive power source disposed in the vehicle, for example. As the driving wheel is rotated, the vehicle travels.

The laser beam source unit is one that outputs a laser beam to the outside of the laser beam source unit. The laser beam source unit has one laser beam source element. The laser beam source unit, however, is not particularly limited, and for example, may have a plurality of laser beam source elements. The laser beam source element is an electric power-light conversion element. The laser beam source element is supplied with electric power from the outside of the laser beam source unit, to output a laser beam. Electric power supplied to the laser beam source element is stored in a battery provided in the vehicle, for example. That is, the laser beam source element is supplied with electric power from the battery provided in the vehicle, to output a laser beam. The laser beam source unit further has a laser driver board, for example. The laser driver board has a driver circuit for controlling one or more laser beam source elements, for example. The laser beam source unit further includes a housing for housing the one or more laser beam source elements and the laser driver board, for example. The output part is provided in the housing, for example. The laser beam source unit may have not only the output part that leads to the forward-rearward branch portion, but also another output part that outputs a laser beam. The other output part does not lead to the forward-rearward branch portion.

The laser beam source unit has front, rear, upper, lower, left, and right side surfaces, for example. In this case, it is only required that the output part be disposed in any of the side surfaces. That is, a direction in which a laser beam is outputted is not particularly limited in the laser beam source unit.

The laser beam source unit is disposed further in the downward direction than the seating surface of the vehicle lateral single seat in a side view of the vehicle, for example. The laser beam source unit is disposed closer to the vehicle lateral single seat than the footrest part in the up-down direction of the vehicle, for example. The laser beam source unit is disposed closer to the forward light-emitting part or to the rearward light-emitting part than the footrest part in the up-down direction of the vehicle, for example.

The laser beam source unit further has the first directional end toward the first direction and the second directional end toward the second direction. The second direction is opposite to the first direction. The first direction and the second direction can be any of the front-back direction, left-right direction, or up-down direction of the vehicle. For example, in a case where the first direction and the second direction are the front-back direction of the vehicle, it may be possible that the first direction is the forward direction of the vehicle while the second direction is the rearward direction of the vehicle, or it may be possible that the first direction is the rearward direction of the vehicle while the second direction is the forward direction of the vehicle. The same applies to a case where the first direction and the second direction are the left-right direction of the vehicle, and a case where the first direction and the second direction are the up-down direction of the vehicle. For example, in a case where the first direction is the forward direction of the vehicle while the second direction is the rearward direction of the vehicle, the laser beam source unit is configured to supply a laser beam emitted from the output part, which is disposed at a position further in the forward direction than the end of the laser beam source unit toward the rearward direction of the vehicle, to each of the forward light-emitting part and the rearward light-emitting part via the forward-rearward branch portion, which is disposed at a position further in the forward direction than the end of the laser beam source unit toward the forward direction. The laser beam source unit may overlap the forward-rearward branch portion, or may not overlap the forward-rearward branch portion, in the first direction or in the second direction.

Each of the forward light-emitting part and the rearward light-emitting part is configured to receive a laser beam, and emit light or allow the laser beam to be transmitted therethrough. The light-emitting part is not particularly limited, and for example has at least one of: a lens for refracting a laser beam, a reflector for reflecting a laser beam, or a side-emitting fiber for emitting a laser beam from a side surface. Light emission manners of the forward light-emitting part and the rearward light-emitting part may be controlled by the laser beam source unit that controls the laser beam source element, or may be controlled by a laser light-emission-manner converter under a situation where the laser beam source element outputs a laser beam. The laser light-emission-manner converter is one that changes the light-emission manner of the light-emitting part. Examples of the laser light-emission-manner converter include an optical switch, a filter, a phosphor, and the like. The forward light-emitting part is, for example, a position lamp, a meter lamp, a flashing light, a headlight, or the like. The meter lamp includes a meter indicator lamp, for example. The meter lamp and the headlight are on all the time while the motive power source that generates power for making the vehicle travel is in operation, for example. Examples of the rearward light-emitting part include a position lamp, a license plate lamp, a flashing light, and the like. The position lamp is a tail lamp, for example. The position lamp and the license plate lamp are on all the time while the motive power source that generates power for making the vehicle travel is in operation, for example. In a side view of the vehicle, the forward light-emitting part and the rearward light-emitting part are disposed further in the upward direction than the footrest part, for example. In a side view of the vehicle, at least one of the forward light-emitting part or the rearward light-emitting part is disposed further in the upward direction than the laser beam source unit, for example.

The fiber optic cable is connected to the output part, for example. The fiber optic cable transmits a laser beam outputted from the output part, to each of the plurality of light-emitting parts, for example.

Of the fiber optic cable, the first part is a shared portion, while the second part and the third part are non-shared portions, respectively, the first part being from the laser beam source unit to the forward-rearward branch portion, the second part being from the forward-rearward branch portion to the forward light-emitting part, the third part being from the forward-rearward branch portion to the rearward light-emitting part.

In a side view of the vehicle, at least a part of the second part or the third part of the fiber optic cable overlaps (or is in parallel with) the laser beam source unit in the up-down direction of the vehicle, for example. In a plan view of the vehicle, at least a part of the second part or the third part of the fiber optic cable overlaps (or is in parallel with) the laser beam source unit in the lateral direction of the vehicle, for example.

Of the fiber optic cable, the second part or the third part overlaps the laser beam source unit in a laser beam output direction, for example. Of the fiber optic cable, the second part or the third part overlaps the laser beam source unit in a direction perpendicular to the laser beam output direction, for example. Additionally, the laser beam output direction is one in which a portion for guiding a laser beam to the outside of the laser beam source unit is directed within the output part, for example.

No limitation is put on combining configurations according to the other aspects described above. Before detailed descriptions of embodiments, it should be understood that the present teaching is not limited to the details of the configuration and arrangement of elements shown in the description below or illustrated in the drawings. The present teaching may be carried out in other embodiments, and may be carried out in embodiments having various modifications. The present teaching can be carried out in appropriate combinations of variations given later.

Advantageous Effects of Invention

The present teaching can efficiently use an equipment installation space in a vehicle that is a leaning vehicle or a straddled vehicle, to prevent or suppress a size increase of the vehicle, while enabling adoption of a laser beam source.

DESCRIPTION OF EMBODIMENTS

In the following, details of a vehicle according to an embodiment of the present teaching will be described with reference to the drawings. The embodiment described below is just an example. It should be noted that the embodiment described below never limits the interpretation of the present teaching.

Figure 1:
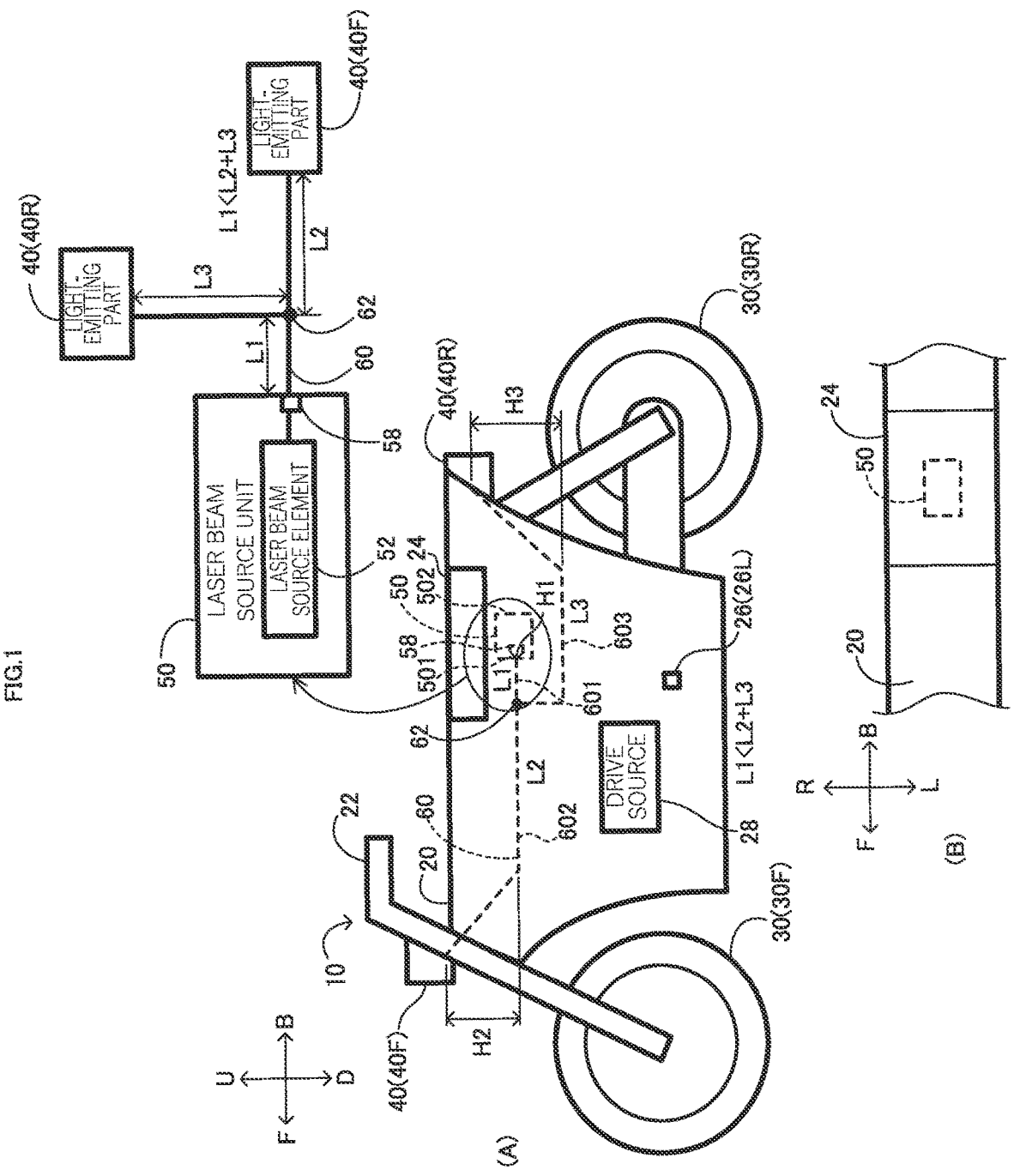
FIG. 1 is a diagram showing a side view of a vehicle according to an embodiment of the present teaching, in conjunction with a laser beam path from a laser beam source unit to each light-emitting part.

Referring to FIG. 1, a straddled vehicle 10 according to an embodiment of the present teaching will be described. The straddled vehicle 10 includes a vehicle body 20, a plurality of wheels 30, a plurality of light-emitting parts 40, a laser beam source unit 50, and a fiber optic cable 60.

The vehicle body 20 has a handlebar 22. The vehicle body 20 supports the handlebar 22 being rotatable The vehicle body 20 has a vehicle lateral single seat 24. The vehicle lateral single seat 24 permits, in the straddled vehicle 10, only one rider to sit thereon in the lateral direction of the straddled vehicle 10 (the direction perpendicular to the drawing sheet). A rider of the straddled vehicle 10 sits on the vehicle lateral single seat 24 while driving the straddled vehicle 10. The vehicle body 20 has a footrest part 26. The footrest part 26 is a part on which the rider sitting on the vehicle lateral single seat 24 places their feet while driving the straddled vehicle 10. In the straddled vehicle 10, the footrest part 26 includes a left step 26L on which the rider places their left foot, and a right step (not shown) on which the rider places their right foot. When the straddled vehicle 10 turns in left direction L, the vehicle body 20 leans in the left direction L, and when the straddled vehicle 10 turns in the right direction R, the vehicle body 20 leans in the right direction R. Various directions in the straddled vehicle 10 are defined on the basis of the rider sitting on the vehicle lateral single seat 24.

The vehicle body 20 supports the plurality of wheels 30. When the straddled vehicle 10 turns in the left direction L, the plurality of wheels 30 lean in the left direction L together with the vehicle body 20, and when the straddled vehicle 10 turns in the right direction R, the plurality of wheels 30 lean in the right direction R together with the vehicle body 20. The plurality of wheels 30 include a front wheel 30F as a steerable wheel, and a rear wheel 30R as a driving wheel. Thus, the front wheel 30F as the steerable wheel is supported by the vehicle body 20. A manipulation on the handlebar 22 by the rider of the straddled vehicle 10 is mechanically transmitted to the front wheel 30F as the steerable wheel, so that the front wheel 30F as the steerable wheel is steered in accordance with the manipulation. The rear wheel 30R as the driving wheel is rotated by receiving power of a drive source 28, which is supported by the vehicle body 20, to make the straddled vehicle 10 travel.

The plurality of light-emitting parts 40 are disposed so as to be visible from the outside of the vehicle. The plurality of light-emitting parts 40 include a forward light-emitting part 40F and a rearward light-emitting part 40R. The forward light-emitting part 40F, which is arranged further in the forward direction than the laser beam source unit 50 in the front-back direction of the vehicle body 20, emits light by using a laser beam supplied from the laser beam source unit 50. The forward light-emitting part 40F is disposed further in the forward direction than the front end of the vehicle lateral single seat 24 such that the forward light-emitting part 40F is visible in a front view of the straddled vehicle 10. The forward light-emitting part 40F may be disposed further in the forward direction than the front end of the vehicle lateral single seat 24 such that the forward light-emitting part 40F can be visually recognized by a rider sitting on the vehicle lateral single seat 24. The rearward light-emitting part 40R, which is arranged further in the rearward direction than the laser beam source unit 50 in the front-back direction of the vehicle body 20, emits light by using a laser beam supplied from the laser beam source unit 50. The rearward light-emitting part 40R is disposed further in the rearward direction than the front end of the vehicle lateral single seat 24 such that the rearward light-emitting part 40R is visible in a rear view of the straddled vehicle 10. Each of the forward light-emitting part 40F and the rearward light-emitting part 40R may function as a flashing light, for example. Each of the forward light-emitting part 40F and the rearward light-emitting part 40R may be functioning all the time while at least the drive source 28 is operating, for example. The forward light-emitting part 40F may function as at least one of a position lamp or a meter lamp, for example. The rearward light-emitting part 40R may function as at least one of a position lamp or a license plate lamp, for example.

The laser beam source unit 50 produces a laser beam to be outputted to the plurality of light-emitting parts 40, and outputs the laser beam thus produced to the plurality of light-emitting parts 40. The laser beam source unit 50 is arranged in the vehicle body 20. The laser beam source unit 50 has a laser beam source element 52 and an output part 58. The laser beam source unit 50 is configured such that a laser beam outputted from the laser beam source element 52 is emitted from the output part 58.

The fiber optic cable 60 constitutes at least a part of a laser beam path for transmitting an outputted laser beam to each of the plurality of light-emitting parts 40. The fiber optic cable 60 connects the laser beam source unit 50 to the plurality of light-emitting parts 40. The fiber optic cable 60 is branched in the middle. The fiber optic cable 60 from the laser beam source unit 50 extends to both the forward light-emitting part 40F and the rearward light-emitting part 40R via a forward-rearward branch portion 62. The fiber optic cable 60 allows a laser beam emitted from the laser beam source unit 50 to be branched in the forward-rearward branch portion 62, and then supplied to both the forward light-emitting part 40F and the rearward light-emitting part 40R. The fiber optic cable 60 is provided such that, in a side view of the straddled vehicle 10, a length L1 of a part of the fiber optic cable 60 from the laser beam source unit 50 to the forward-rearward branch portion 62 is shorter than a total length (L2+L3) of a part of the fiber optic cable 60 from the forward-rearward branch portion 62 to the forward light-emitting part 40F and a part of the fiber optic cable 60 from the forward-rearward branch portion 62 to the rearward light-emitting part 40R. The fiber optic cable 60 may be provided such that, in a side view of the straddled vehicle 10, a length L1 of a part of the fiber optic cable 60 from the laser beam source unit 50 to the forward-rearward branch portion 62 is shorter than at least either of the length L2 of a part of the fiber optic cable 60 from the forward-rearward branch portion 62 to the forward light-emitting part 40F or the length L3 of a part of the fiber optic cable 60 from the forward-rearward branch portion 62 to the rearward light-emitting part 40R.

The laser beam source unit 50 further has a first directional end 501 toward a first direction and a second directional end 502 toward a second direction. The second direction is the direction opposite to the first direction. In the example shown in FIG. 1, the first direction is the forward direction of the straddled vehicle 10, and the second direction is the rearward direction of the straddled vehicle. The laser beam source unit 50 is configured to supply a laser beam emitted from the output part 58, which is disposed at a position further in the forward direction than the end 502, to each of the forward light-emitting part 40F and the rearward light-emitting part 40R via the forward-rearward branch portion 62, which is disposed at a position further in the forward direction than the end 501.

At least a part of the laser beam source unit 50 is positioned further in the upward direction than the footrest part 26 in a side view of the straddled vehicle 10, and is positioned between the left end and the right end of the vehicle lateral single seat 24 in a plan view of the straddled vehicle 10.

The fiber optic cable 60 has a first part 601, which is from the laser beam source unit 50 to the forward-rearward branch portion 62, a second part 602, which is from the forward-rearward branch portion 62 to the forward light-emitting part 40F, and a third part 603, which is from the forward-rearward branch portion 62 to the rearward light-emitting part 40R; and in a side view of the straddled vehicle 10, each of these parts has the upper portion and the lower portion in the up-down direction of the straddled vehicle 10. In the up-down direction of the straddled vehicle 10, a length H1 from the upper portion to the lower portion of the first part 601 may be shorter than a length H2 from the upper portion to the lower portion of the second part 602, and shorter than a length H3 from the upper portion to the lower portion of the third part 603.

In a side view of the straddled vehicle 10, at least a part of the second part 602 or the third part 603 of the fiber optic cable 60 overlaps (or is in parallel with) the laser beam source unit 50 in the up-down direction of the straddled vehicle 10. In the example shown in FIG. 1, the third part 603 overlaps (or is in parallel with) the laser beam source unit 50 in the up-down direction of the straddled vehicle 10 in a side view of the straddled vehicle 10.

In the straddled vehicle 10, the forward light-emitting part 40F and the rearward light-emitting part 40R share the single laser beam source unit 50, which makes it possible to downsize the laser beam source unit 50 as a whole, as compared to when two or more laser beam source units are used. Consequently, the laser beam source unit 50 can be arranged with a high degree of freedom. Since the single laser beam source unit 50 is disposed between the forward light-emitting part 40F and the rearward light-emitting part 40R in the front-back direction of the straddled vehicle 10, a change in the length of the fiber optic cable 60 as a whole can be suppressed or prevented even when the position of the branch portion 62 is changed. In addition, the length L1 of a part (shared portion) of the fiber optic cable 60, which is from the laser beam source unit 50 to the branch portion 62, is shorter than the total length (L2+L3) of the parts (non-shared portions) of the fiber optic cable 60, which are from the branch portion 62 to the forward light-emitting part 40F and to the rearward light-emitting part 40R. This allows the laser beam source unit 50 to be arranged with a high degree of freedom in the front-back direction of the straddled vehicle 10. Adjustment of a layout of equipment in the straddled vehicle 10 is facilitated. Efficient use of an equipment installation space is enabled. Furthermore, since the shared portion is short, a size increase of a routing space can be prevented or suppressed, and thus compact arrangement is enabled. Since agility, maneuverability, and simplicity are important in the straddled vehicle 10, obtaining both the compact arrangement and the efficient use of the space is preferred.

(Variation)

Figure 2:
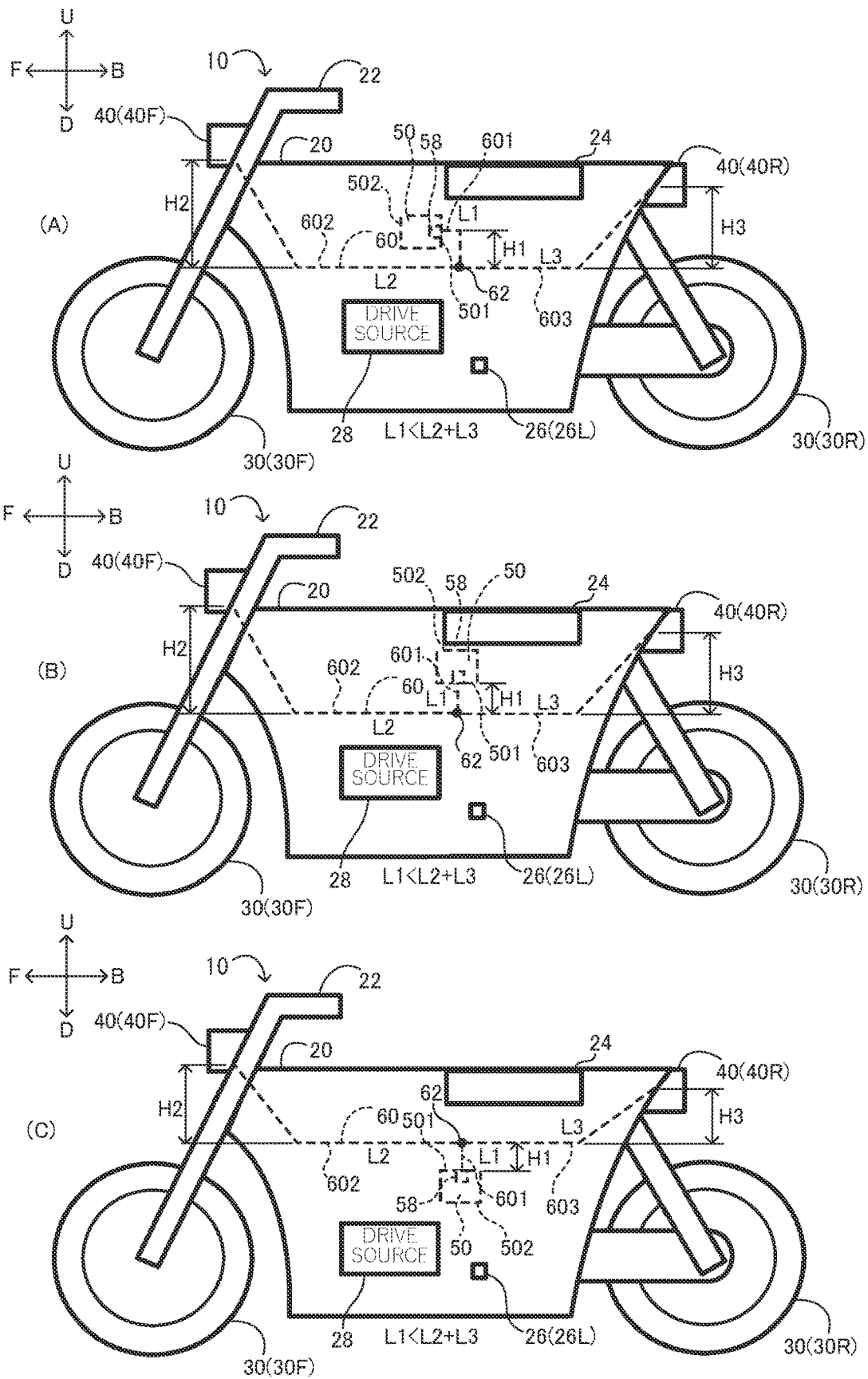
FIG. 2 is a diagram showing variations of the positional relationship between a forward-rearward branch portion of a fiber optic cable and the laser beam source unit in the vehicle according to the embodiment of the present teaching.
Figure 3:
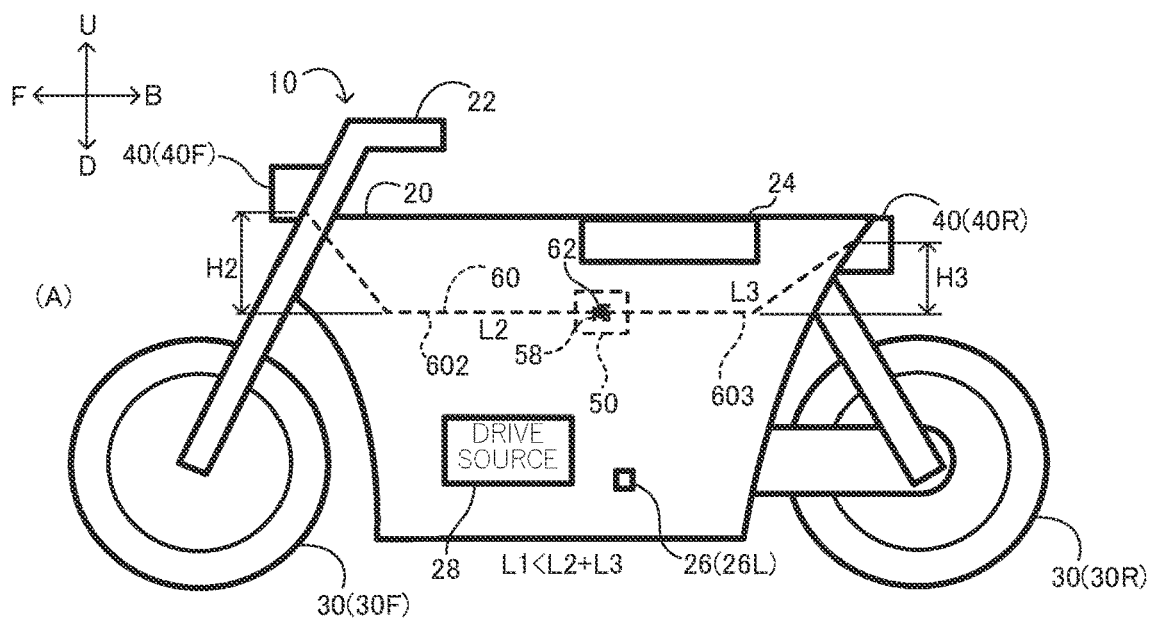
FIG. 3 is a diagram showing other variations of the positional relationship between the laser beam source unit and the forward-rearward branch portion of the fiber optic cable in the vehicle according to the embodiment of the present teaching.
Figure 3:
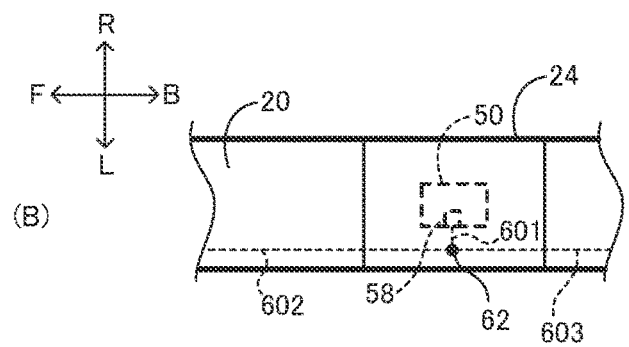
Figure 3:
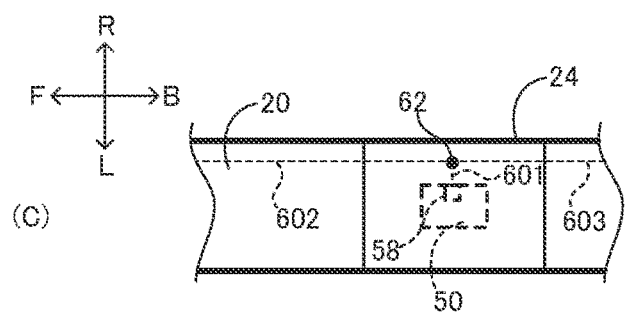

In FIG. 1, the forward-rearward branch portion 62 is positioned further in the forward direction than the laser beam source unit 50. The positional relationship between the forward-rearward branch portion 62 and the laser beam source unit 50 is not limited to this. For example, the positional relationships shown in FIG. 2 and FIG. 3 are acceptable.

Figure 4:
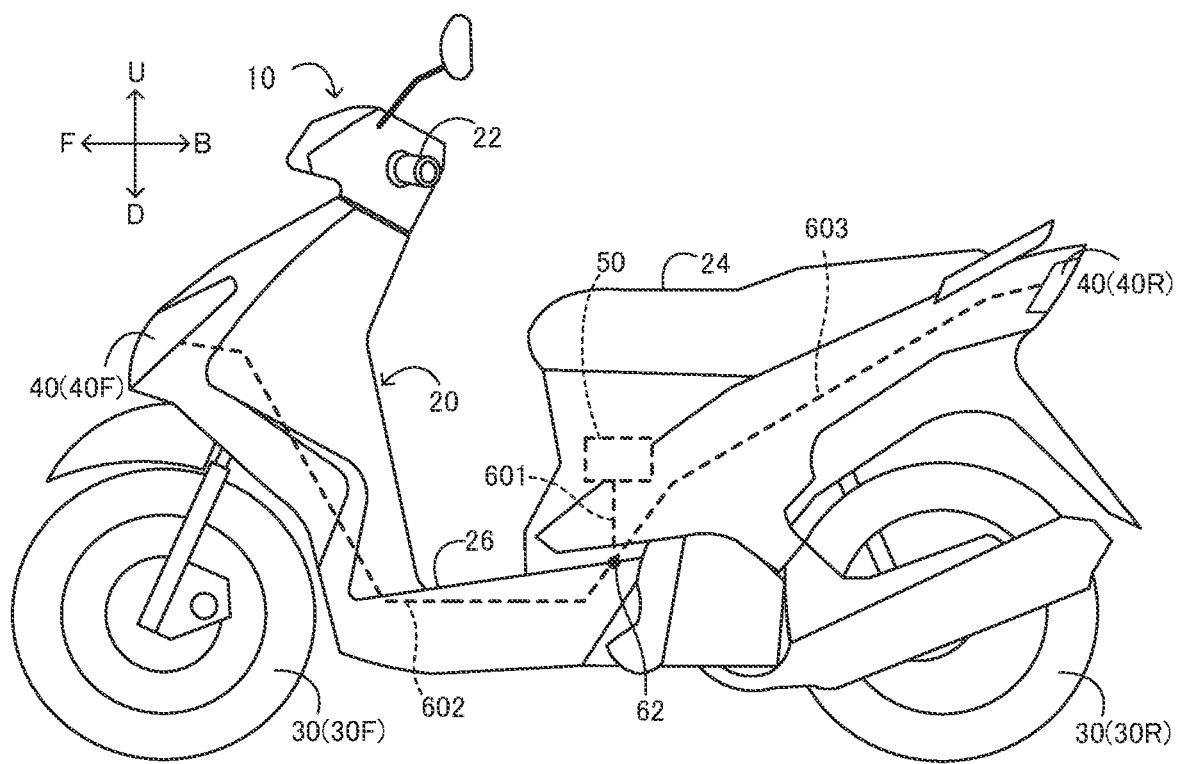
FIG. 4 is a diagram showing a scooter as a vehicle according to another embodiment of the present teaching.

FIG. 1 illustrates a case where the footrest part 26 includes steps. The footrest part 26 is not limited to including left and right steps, however. For example, the footrest part 26 may be a foot board 26A as illustrated in FIG. 4.

Other Embodiments

The embodiment and variation, of at least either one of description or illustration has been given herein, are for ease of understanding the present disclosure, and not for limiting the concept of the present disclosure. The foregoing embodiment and variation may be altered and/or adapted without departing from the spirit of the present disclosure. The spirit encompasses equivalent elements, modifications, omissions, combinations (for example, a combination of a feature of the embodiment and a feature of any variation), adaptations and/or alterations as would be appreciated by those skilled in the art based on the embodiment disclosed herein. The limitations in Claims are to be interpreted broadly based on the language employed in Claims and not limited to embodiments and variations described herein or during the prosecution of the present application. The embodiments and variations are to be construed as non-exclusive. For example, in this Description, the terms "preferably," "may," and "possible" are non-exclusive and mean "preferably, but not limited to," "may, but not limited to," and "possibly, but not limited to," respectively.

REFERENCE SIGNS LIST 10 straddled vehicle
20 vehicle body
22 handlebar
24 vehicle lateral single seat
26 footrest part
30 wheel
40 light-emitting part
50 laser beam source unit
52 laser beam source element
60 fiber optic cable

The invention claimed is:

1. A vehicle that is a leaning vehicle or a straddled vehicle having a plurality of wheels, the vehicle comprising:
a vehicle body supporting the plurality of wheels, the vehicle body including a seat and a footrest part, the seat being configured to accommodate only one rider to sit thereon in a lateral direction of the vehicle, the footrest part being configured to allow the rider sitting on the seat to place his or her foot on the footrest part while driving the vehicle;
one laser beam source unit disposed in the vehicle body, the laser beam source unit having
one or more laser beam source elements each configured to generate a laser beam, and
an output part shared by the one or more laser beam source elements for emitting the generated laser beam;
a forward light-emitting part disposed further forward than the laser beam source unit in a front-back direction of the vehicle, the forward light-emitting part being configured to emit light from the laser beam supplied by the laser beam source unit;
a rearward light-emitting part disposed further rearward than the laser beam source unit in the front-back direction of the vehicle, the rearward light-emitting part being configured to emit light from the laser beam supplied by the laser beam source unit; and
a fiber optic cable extending from the laser beam source unit to both the forward light-emitting part and the rearward light-emitting part via a forward-rearward branch portion, to thereby allow the laser beam emitted from the laser beam source unit to be branched in the forward-rearward branch portion, and to then be supplied to both the forward light-emitting part and the rearward light-emitting part, wherein in a side view of the vehicle, a length of the fiber optic cable between the laser beam source unit and the forward-rearward branch portion is shorter than a sum of a length of the fiber optic cable between the forward-rearward branch portion and the forward light-emitting part and a length of the fiber optic cable between the forward-rearward branch portion and the rearward light-emitting part;

the laser beam source unit further has a first directional end toward a first direction and a second directional end toward a second direction that is opposite to the first direction, the output part being at a position further in the first direction than the second directional end, the forward-rearward branch portion being at a position further in the first direction than the first directional end, the first direction and the second direction are in any of the front-back direction, a left-right direction, or an up-down direction of the vehicle; and at least a part of the laser beam source unit is positioned further upward than the footrest part in the side view of the vehicle, and positioned between a left end and a right end of the seat in a plan view of the vehicle.

2. The vehicle according to claim 1, wherein the rearward light-emitting part is disposed further rearward than a front end of the seat such that the rearward light-emitting part is visible in a rear view of the vehicle, and the forward light-emitting part is disposed further forward than the front end of the seat such that the forward light-emitting part
- is visible in a front view of the vehicle, or
- is visible to the rider sitting on the seat, or
- is visible both in the front view of the vehicle and to the rider sitting on the seat.

3. The vehicle according to claim 1, wherein the length of the fiber optic cable between the laser beam source unit and the forward-rearward branch portion is shorter than one, or both, of the length of the fiber optic cable between the forward-rearward branch portion and the forward light-emitting part and the length of the fiber optic cable between the forward-rearward branch portion and the rearward light-emitting part.

4. The vehicle according to claim 1, wherein each of the forward light-emitting part and the rearward light-emitting part functions as a flashing light.

5. The vehicle according to claim 1, further comprising a motive power source that generates power to be transmitted to at least one of the plurality of wheels, wherein each of the forward light-emitting part and the rearward light-emitting part is continuously on while the motive power source is in operation.

6. The vehicle according to claim 1, wherein the forward light-emitting part functions as one or both of a position lamp and a meter lamp, and the rearward light-emitting part functions as one or both of a position lamp and a license plate lamp.

7. The vehicle according to claim 1, wherein the fiber optic cable has:
- a first part that is from the laser beam source unit to the forward-rearward branch portion,
- a second part that is from the forward-rearward branch portion to the forward light-emitting part, and
- a third part that is from the forward-rearward branch portion to the rearward light-emitting part;

in the side view of the vehicle, each of the first part, the second part, and the third part of the fiber optic cable has an upper portion and a lower portion in the up-down direction of the vehicle; and in the up-down direction of the vehicle, a distance between the upper portion and the lower portion of the first part is shorter than a distance between the upper portion and the lower portion of the second part, and shorter than a distance between the upper portion and the lower portion of the third part.

\* \* \* \* \*